Aug. 26, 1958

J. F. STEPHENS 2,849,640

SPACER STRUCTURE

Filed Oct. 26, 1954

INVENTOR:
JOE F. STEPHENS,
BY *Nathan J Cornfeld*
HIS ATTORNEY.

United States Patent Office 2,849,640
Patented Aug. 26, 1958

2,849,640

SPACER STRUCTURE

Joe F. Stephens, Owensboro, Ky., assignor to General Electric Company, a corporation of New York Application October 26, 1954, Serial No. 464,766

3 Claims. (Cl. 313—292)

My invention relates to electronic tube structures and pertains more particularly to a new and improved mica spacer for use therein.

In some electronic tubes, such as those of the receiving type, it is customary to support the various elements therein such as the cathode, plate and grids between spaced insulative disks formed of mica or any other suitable insulative material. Such disks are additionally often employed for isolating certain tube elements. For example, in some tube structures it is desirable to isolate the getter which is usually an alkaline earth metal substance introduced into the tube during manufacture and adapted for being vaporized after the tube has been evacuated thereby to absorb any gases which may have been left during the exhaust operation. The getter, when vaporized, usually leaves a silvery deposit on the inside of the glass envelope of the tube and any of the tube elements with which it may come in contact. This deposit is conductive and therefore it is desirable to isolate the getter in the tube envelope in order thereby to prevent any deposit on the mica disks supporting the mentioned tube elements which might result in short-circuiting the various tube elements. In some tube structures the getter is in strip form and supported between the ends of a wire bight atop the tube cage comprising the various tube elements and mica disks. In such structures it has been the practice to isolate the getter in the upper end of the tube envelope by supporting a mica shield between the getter and the top mica and in spaced relation to the top mica. In carrying out this practice, it has been customary to provide spacer structures comprising pieces of strip metal having spaced transversely extending rods welded thereto. At least two of these spacer structures were provided and the ends of the rods extended through suitable apertures formed in the top mica and mica shield. The lower ends of the rods were suitably anchored in the top mica and the mica shield was retained on the rods by having a member welded between the upper end portions of the rods extending through the mica shield. Often the getter support was welded to the ends of the rods of one spacer structure thereby to retain the mica shield. Providing spacer structures of the type just described and retaining the mica shield in the manner described proved generally difficult and costly, particularly due to the number of welding operations required. From the standpoints of simplified construction, ease of assembly and cost reduction it is desirable to provide means for supporting the mica shield in spaced relation to the top mica without having to rely on any welding operations. Additionally, it is desirable to provide means for supporting the getter with at least a minimum of welding operations. It is the primary object of my invention to provide a new and improved mica spacer structure.

It is another object of my invention to provide a new and improved mica spacer structure adapted for being fabricated without resorting to welding.

It is another object of my invention to provide a new and improved mica spacer adapted for facilitating the mounting of a getter support.

Another object of my invention is to provide a new and improved mica spacer adapted for being formed from a single blank of material.

Further objects and advantages of my invention will become apparent as the following description proceeds and the features of novelty which characterize my invention will be pointed out with particularity in the claims annexed to and forming part of this specification.

In carrying out the objects of my invention, I provide a blank of material including a first portion off of which is formed a tab, and at least one laterally extending portion adapted for being bent at an angle to the first portion and including a tab extending opposite to the tab on the first portion. The laterally extending portion, when bent, is adapted for being disposed, together with the first portion, between the mica disks to be spaced. The tabs are adapted for extending through suitable apertures in the mica disks and being bent for thereby securing the disks in spaced relation. The tabs are additionally adapted for having other tube elements such as a getter support secured thereto.

For a better understanding of my invention reference may be had to the accompanying drawing in which.

Figure 1:
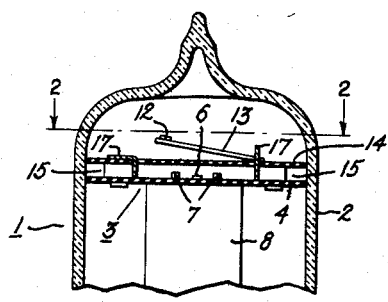
Fig. 1 is an enlarged fragmentary sectional view of a tube incorporating a preferred embodiment of my invention.

Referring to the drawing, there is fragmentarily shown in Fig. 1 an electronic tube 1 including a tube envelope 2 formed of glass or any other suitable insulative material and a tube cage generally designated 3. The tube cage comprises a spaced pair of mica disks which shall hereinafter be referred to as the top or upper mica 4, as shown in Figs. 1–4, and the bottom mica 5 shown in Fig. 2.

The top and bottom micas are adapted for supporting in spaced relation a cathode sleeve 6, at least one pair of rods 7 adapted for supporting a grid (not shown) and an anode 8. The anode 8 is adapted for being suitably secured between the upper and lower micas by retaining members generally designated 9 in Fig. 2.

Figure 2:
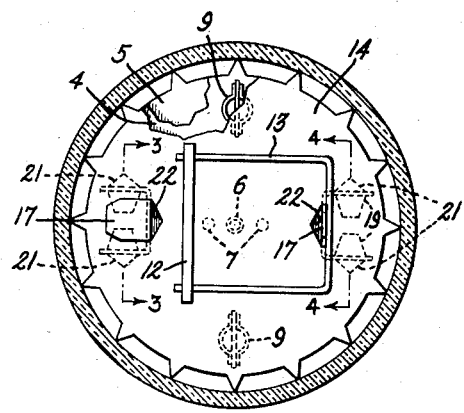
Fig. 2 is an enlarged section taken along the line 2—2 in Fig. 1.

Now, as seen in Figs. 1 and 2, a getter 12 comprising a strip of suitable gettering material is secured between the ends of a wire bight 13 whereby the getter is adapted for being supported in the tube envelope. In a manner to be described in detail hereinafter, the wire bight 13 for supporting the getter 12 is adapted for being supported in the tube envelope through the agency of a particular feature of my invention.

While the specific manner of supporting the getter in the tube envelope has not as yet been described in detail it will be clear from the drawing that the getter support and the getter carried thereby are adapted for being supported in the tube envelope atop the tube cage 3. It will be seen that in such an arrangement there lies the risk of the silvery conductive material, resulting from the flashing or vaporization of the getter, depositing on the upper surface of the top mica 4 and thereby providing a short-circuiting electrical path between the portions of the cathode sleeve 6, grid rods 7 and the anode 8 which extend through the top mica. It is for this reason that a mica shield 14 is provided. The mica shield 14 is interposed between the getter 12 and the upper mica disk 4 of the cage 3 thereby to avoid any deposit of conductive material resulting from the flashing of the getter on the upper surface of the top mica 4.

Figure 5:
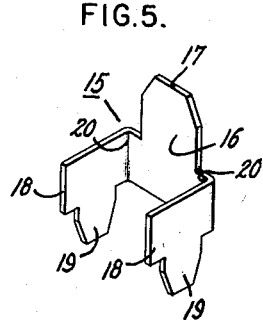
Fig. 5 is an enlarged perspective view of the preferred embodiment of my invention.

My invention comprises a spaced member generally designated 15 in Fig. 5 and which is particularly adapted for supporting the mica shield 14 in spaced relation above the upper mica disk 4. The member 15 is adapted for being formed from a single blank of any material which is suitably rigid and may be bent in the manner shown in Fig. 5. The member 15 may be formed to include a first or central portion 16 off of which is formed an upwardly extending tab 17. Additionally, the member 15 may be formed to include a pair of oppositely disposed laterally extending portions 18 off of each of which is formed a pendent tab 19. Thus, and as seen in the drawing, pendent tabs 19 extend from the longitudinally opposite edges of the member 15. The flat blank may be bent along the lines indicated at 20 in order thereby to assume the configuration thereof shown in Fig. 5. As also seen in the drawing, the first or central portion 16 and each portion 18 extend laterally with respect to each other or, in other words, the central portion 16 and each portion 18 are in mutually laterally extending relation.

As seen in Fig. 1, the mica shield disk 14 may be supported atop the upper disk 4 by at least two diametrically oppositely disposed spacer members 15. At each of the areas of the disk 4 at which the members 15 are to be located, the disk 4 is formed to provide a pair of triangular apertures 21 spaced to correspond substantially to the spacing between the side portions 18 of the members 15. Thus, the top mica 4 is adapted for having the tab portions 19 of the members 15 extend therethrough. Following insertion of the tabs 19 into the apertures 21 the tabs 19 are bent, preferably inwardly under the portions of the top mica between the pairs of apertures 21 in the manner shown in Figs. 2–4, whereby the members are adapted for being retained or secured to the top mica.

Figure 3:
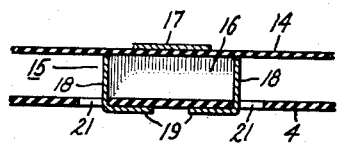
Fig. 3 is an enlarged section taken along the line 3—3 in Fig. 2.
Figure 4:
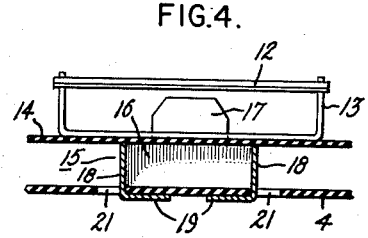
Fig. 4 is an enlarged section taken along the line 4—4 in Fig. 2.

As seen in Fig. 2, the mica shield 14 is formed to include a pair of triangular apertures 22 disposed and adapted for receiving the tabs 17 on the central portions 16 of the members 15 when the mica shield is placed atop the spacer members 15 in the manner shown in Figs. 1, 3 and 4. As seen in Figs. 1–3, the tabs 17 are adapted for being bent down for engaging the upper surface of the mica shield 14, thereby effectively to retain the mica shield 14 in the position thereof shown in the drawing. Thus it will be seen that by my invention spacing means is provided which may be formed of a single blank of material and which is adapted for securing together in spaced relation members such as the top mica 4 and the mica shield 14 without resorting to welding or any other costly and time consuming operation. Additionally, it will be seen that my spacer is adapted for facilitating greatly the assembly of the tube structure in which it is employed.

As best seen in Figs. 1 and 4 both of the upwardly extending tabs 17 need not be bent down but instead one may be utilized in providing support for the wire bight 13 which in turn supports the getter 12. One of the tabs 17 may be utilized for supporting the member 13 by means of a single welding step whereby the member 13 is welded to the side of the tab 17 at a point immediately above the mica shield 14. When the tab 17 is utilized in this manner it need not be bent down for engaging the mica shield 14 since the member 13, inasmuch as it is larger than the aperture 22 through which the tab 17 extends, will effectively secure the shield 14 in place on the member 15.

It is to be understood that while I have shown and described my invention as means adapted for supporting a mica shield atop the upper mica of a tube cage for the purpose of interposing the shield between the upper mica and a getter, my invention is not limited to this use but is applicable for use wherever it is desired simply and inexpensively to support two spaced members. For instance, by elongating the portions 16 and 18, the members 15 could be employed for suitably securing in spaced relation the top and bottom micas 4 and 5, respectively.

It is to be further understood that while I have shown my spacer member 15 formed to include a central portion 16 and two oppositely disposed side portions 18, the spacer member 15 would be adequate for some purposes if it comprised the portion 16 and only a single one of the side portions 18. One of the members 15 so formed would be adapted for being disposed between the members to be spaced apart and the tab 17 would be adapted for passing through and being bent over a portion of one of the members to be spaced while the tab 19 would be adapted for extending through and being bent over a portion of the other member to be spaced. Thus in a manner similar to that described above the spacer structure 15 would be effective for maintaining the spaced members in suitable spaced relation.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. A spacer, comprising a member of U-shaped cross section throughout its length adapted to be disposed edgewise between a pair of elements to be spaced, said member having portions extending from longitudinally opposite edges thereof and adapted to extend through said elements and to be secured thereto, thereby to secure said elements to said member.

2. A sheet metal spacer member of a U-shaped cross section throughout its length and adapted for being disposed edgewise between a pair of elements to be secured rigidly together in parallel spaced relation, said spacer member including a central portion having a longitudinally extending tab adapted for extending through and being bent over one of said elements, and said spacer member further including a pair of side portions, each said side portions having a tab extending longitudinally therefrom and oppositely with respect to said tab on said central portion and adapted for extending through and being bent over the other of said elements.

3. In an electronic tube, an insulative disk, a getter support, a shield interposed between said disk and getter support and in parallel spaced relation with said disk, and a spacer member of U-shaped cross section throughout its length disposed edgewise between said disk and shield, said spacer member having tabs extending from the opposite edges thereof, one of said tabs extending through and being bent over said disk for securing said disk to said spacer member, another of said tabs extending through said shield and having said getter support secured thereto with said getter support engaging said shield over said spacer member, whereby said getter support is effectively mounted and adapted for rigidly securing said shield to said spacer member.

References Cited in the file of this patent

UNITED STATES PATENTS

| | | |
|---|---|---|
| 1,866,715 | Krahl | July 12, 1932 |
| 2,148,538 | Depew et al. | Feb. 28, 1939 |
| 2,163,310 | Miller | June 20, 1939 |
| 2,289,588 | Miller | July 14, 1942 |
| 2,324,367 | Dailey | July 13, 1943 |
| 2,507,706 | Gee et al. | May 16, 1950 |
| 2,690,522 | Baker | Sept. 28, 1954 |
| 2,770,751 | Prager et al. | Nov. 13, 1956 |